(12) United States Patent
Jeffrey (10) Patent No.: US 9,373,265 B2
(45) Date of Patent: *Jun. 21, 2016

(54) CONDITIONING APPARATUS AND RELATED METHOD

(76) Inventor: Richard M. Jeffrey, Santa Barbara, CA (US)

( * ) Notice: Subject to any disclaimer, the term of this patent is extended or adjusted under 35 U.S.C. 154(b) by 389 days.

This patent is subject to a terminal disclaimer.

(21) Appl. No.: 13/464,596

(22) Filed: May 4, 2012

(65) Prior Publication Data

US 2013/0295528 A1 Nov. 7, 2013

(51) Int. Cl.
| G09B 11/06 | (2006.01) |
| G09B 11/04 | (2006.01) |
| G09B 19/00 | (2006.01) |

(52) U.S. Cl.
CPC .............. *G09B 11/04* (2013.01); *G09B 19/003* (2013.01)

(58) Field of Classification Search
CPC ..... G09B 11/04; A63F 13/10; A63B 37/0003
USPC ................................ 434/88; 463/56
See application file for complete search history.

(56) References Cited

U.S. PATENT DOCUMENTS

| D391,380 S  | * | 2/1998 | Brantley .................. D26/39 |
| 5,898,161 A | * | 4/1999 | DeVita ............... G04B 37/0016 |
|             |   |        | 235/462.44 |
| 6,346,933 B1 | * | 2/2002 | Lin .............................. 345/157 |
| 8,096,674 B2 | * | 1/2012 | Matthews et al. ............... 362/206 |
| 2008/0188314 A1 | * | 8/2008 | Rosenblum ...................... 463/52 |
| 2011/0021273 A1 | * | 1/2011 | Buckley et al. ................ 463/31 |

OTHER PUBLICATIONS

Technical Solutions: Laser Pointer with Flexi Control Module (www.tecsol.com.au).*
Laser Pointer w/ Flexi Control Module (www.tecsol.com.au); Apr. 8, 2010.*
Streamlight 61407 Enduro Head-Mounted Flashlight with Visor Clip and Elastic Strap (http://www.amazon.com/Streamlight-61407-Head-Mounted-Flashlight-Elastic/dp/B002OJWO7W); Mar. 10, 2012.*
SE LED Finger Lamps (http:www.amazon.com/40-Super-Bright-Finger-Flashlight/dp/B0018LAGZY);Nov. 24, 2009.*
(http:/www.amazon.com/40-Super-Bright-Finger-Flashlight/dpB0018LAGZY).*

* cited by examiner

*Primary Examiner* — Robert J Utama
*Assistant Examiner* — Elroy S Crocker (57) ABSTRACT

In one embodiment, a conditioning apparatus for conditioning a user includes a target, and an illumination source spaced apart from the target. The illumination source is configured to project a light upon the target for use in response to movement of the user.

2 Claims, 6 Drawing Sheets

CONDITIONING APPARATUS AND RELATED METHOD

CROSS-REFERENCE TO RELATED APPLICATIONS

This application claims priority and the benefit of U.S. patent application Ser. No. 13/065,123, filed Mar. 15, 2011, which is a continuation of U.S. patent application Ser. No. 12/655,552, filed Dec. 21, 2009, entitled "Conditioning Apparatus and Related Method", which is now U.S. Pat. No. 7,927,252 the disclosures of which are incorporated herein by reference in their entirety.

TECHNICAL FIELD

The disclosure herein relates to a conditioning apparatus and related methods, and more particularly to a sports or therapeutic conditioning apparatus having an illumination source to project a light onto a target for use as a point of reference during, among other things, operation of the conditioning device.

BACKGROUND

Illumination sources such as laser devices are common place and find utility in thousands of highly varied applications in every section of modern society, including consumer electronics (printers and CDs), information technology, science (spectroscopy) medicine (surgery), industry (cutting), law enforcement, entertainment, and the military (rifle scope).

Lasers also find utility in recreational devices such as those associated with the well-known game of laser tag for positioning the laser on another player in the game, and sports training where, for example, a laser may be used to correctly align a golf club shaft and as an aid for the golfer to check his grip on the club and position for addressing a golf ball.

Although associated and utilized in a variety of applications, to date, no known lasers are used in a sports or therapeutic conditioning device, and more specifically, in a sports or therapeutic conditioning apparatus wherein a laser device projects a laser beam to a target for use as a point of reference during, among other things, operation of the conditioning apparatus.

SUMMARY

For the purpose of summarizing the claimed subject matter certain objects and advantages have been described. It is to be understood that not all such objects or advantages may be achieved in accordance with any particular embodiment. Thus, for example, those skilled in the art will recognize that the device described herein may be embodied or carried out in a manner that achieves or optimizes one advantage or group of advantages as taught herein without necessarily achieving other objects or advantages.

In one embodiment, a conditioning apparatus comprises a target having a traceable pattern; and an illumination source spaced apart from the target. The illumination source is configured to be disposed on the head of a user and project a light upon the traceable pattern for use as a visual reference point in response to movement of the user tracing the pattern.

In another embodiment, a conditioning apparatus comprises a target having one or more light sensitive indicia disposed thereon; and an illumination source spaced apart from the target. The illumination source is configured to be disposed on the body of a user and project a light upon the one or more light sensitive indicia to activate the one or more light sensitive indicia in response to movement of the user, and wherein activation of the one or more light sensitive indicia enables a corresponding nonverbal communication to be made available.

These and other embodiments will become readily apparent to those skilled in the art from the following detailed description having reference to the attached figures, the subject matter described herein not being limited to any particular embodiment(s) disclosed.

DETAILED DESCRIPTION

Exemplary embodiments will now be described with references to the accompanying figures, with like reference numerals referring to like elements throughout. The terminology used in the description is not intended to be interpreted in any limited or restrictive manner, simply because it is being utilized in conjunction with a detailed description of certain embodiments. Furthermore, various embodiments (whether or not specifically described herein) may include novel features, no single one of which is solely responsible for its desirable attributes or which is essential to practicing the subject matter described herein.

As indicated above, the subject matter described herein relates to a conditioning apparatus having an illumination source such as a laser beam, light emitting diode (LED), or similar type of illuminating device for projecting a light or other visual cue to a target for use as a point of reference during, among other things, operation of the conditioning device.

In one embodiment, the conditioning apparatus described herein may be considered a sports conditioning apparatus configured and designed to improve the flexibility, strength, and control, of among other things, the hips and core structure of a user, while ingraining and refining patterns of movement directly applicable to comparable movements used in a variety of sporting activities.

Such patterns of movement and their corresponding sporting activities include, but are not limited to the swing of a golf club, a baseball bat, and a tennis racket, as well as other endeavors where rotational movement of the hips and core structure including associated muscle groups are activated.

In one embodiment, the conditioning apparatus described herein may be considered a therapeutic conditioning apparatus that utilizes laser technology to improve the user's everyday body functionality and quality of life by reducing or relieving back, hip, neck, and shoulder pain, as well as increasing blood flow to the pelvic region that may improve erectile dysfunction (ED) in men. The conditioning apparatus may further improving posture by conditioning the hips and core structure, as well as increasing the user's range of motion, flexibility, functionality, control, and strength of various body parts.

One study shows that people experiencing back pain generally have weak, underdeveloped or untrained inner core muscles. The most important of the inner core stabilizing muscles are the transversus abdominis (the deepest layer of lateral abdominal muscles), the lumbar multifidi (the deepest of the lower back muscles) and the pelvic floor muscles. The study further shows that people with a history of low back pain may tend to use the stronger outer core muscles for the tasks that would normally, in a healthy system, call on the inner core muscles to perform. Such activity further weakens the inner core muscles leading to a cycle of mind-body "discontinuity" formation by improperly training the body to rely on the wrong muscle groups. In one embodiment, the conditioning apparatus described herein targets the inner core muscles and trains them to become a consistent support system for the body.

In a similar manner, the conditioning apparatus described herein may be considered a therapeutic conditioning apparatus to improve various aspects of the mind (mental), body, and/or spirit. In this regard, the conditioning apparatus may be configured and designed to increase mental focus, improve brain and visual coordination, increase reading and comprehension, improve balance, as well as posture and general body alignment, relieve stress, and open energy channels or meridians throughout the body.

Further in this regard, the conditioning apparatus described herein may be configured and designed to increase the ability for nonverbal communication, as well as improve manual dexterity, hand-eye coordination, and nerve regeneration.

In this regard, the conditioning apparatus described herein may include an illumination source having a laser device to project a laser beam to a target to provide a precise and continuous real time visual representation of the user's body movement including movements of the user's hips, head, finger, finger tip, and shoulders, to name a few, when performing movement patterns designed to condition the user's hips and core structure to relieve back or hip pain, improve various aspects of the mind (mental), body, and/or spirit, as well as increase the ability for nonverbal communication, manual dexterity, hand-eye coordination, and nerve regeneration.

For convenience, the conditioning apparatus is primarily described below and in FIGS. 1-3 as a conditioning apparatus that may be configured and designed for conditioning a user's hips and core structure. The conditioning apparatus is further described below and in FIGS. 4-6 as a conditioning apparatus that may be configured and designed for conditioning various aspects of the mind (mental), body, and/or spirit, as well as increase the ability for nonverbal communication, manual dexterity, hand-eye coordination, and nerve regeneration. Persons of ordinary skill in the art will understand that various structural aspects, principals, advantages, benefits, and other characteristics of one of the conditioning apparatus described herein including various configuration of the target may be equally applicable to another conditioning apparatus likewise described herein.

In one embodiment, such visual representations, which track the user's body movement via the laser beam, are projected onto a target having predetermined movement pattern(s) printed, placed, configured, or otherwise represented thereon so that the user may attempt to follow or trace the movement pattern(s) with the user's own movement to thereby increase flexibility, strength, and control of the user's hips and core structure.

Such visual representation of the user's body movement provides an immediate feedback response to guide the user in proper biomechanics. In this regard, the "direct visual feedback" provided by the conditioning apparatus is a relaxing and easy to follow road map that forms a unique "mind-body" connection to facilitate significant gains in body strength and flexibility in a relatively short period of time.

The conditioning apparatus may be considered as combining physical movements with multi-sensory stimulation that benefit the user psychologically including right-left brain integration, improvement in the ability to focus, and mind-body cohesion. The conditioning apparatus may further help to break the cycle of "discontinuities" between the mind and body, and to permit new and proper habits to form by activating the proper muscle groups on a subconscious level so proper movement patterns become common practice.

In another embodiment, the laser beam used to track the user's body movement is projected onto a light sensitive target configured to convert the light received from the laser device into electronic or digital data capable of being stored on a computer readable medium or similar storage device for later viewing and analysis by the user.

In this regard, the conditioning apparatus may further include a processing element having a processing program and access to the storage device, and a processing-readable medium having executable instructions thereon to direct the processing system when used by the processing element to display the electronic data as a visual representation of the movement of the light upon the traceable pattern.

Figure 1:
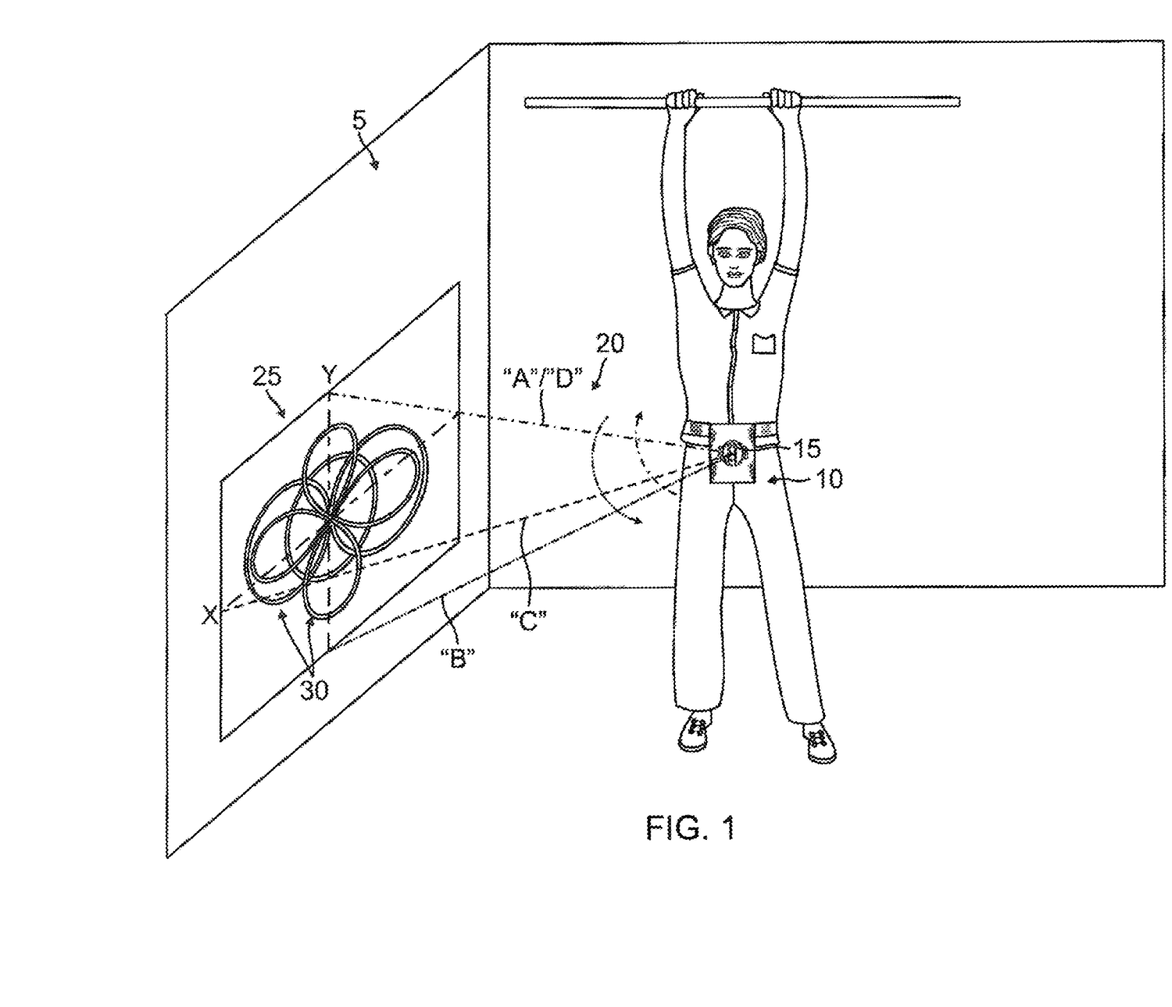
FIG. 1 is a perspective view of one embodiment of the conditioning apparatus including an illumination source and a target.

FIG. 1 is a perspective view of one embodiment of the conditioning apparatus. The conditioning apparatus 5 includes an illumination source 10 for projecting a light. Although the conditioning apparatus is described herein as utilizing a laser beam, other illumination sources may be utilized including, but not limited to a light emitting diode (LED), or similar type of illumination source or visual cue.

In this regard, the illumination source 10 may include a laser device 15 for projecting a laser beam 20, and a target 25 spaced apart from the illumination source 10 for receiving the laser beam 20. The target 25 includes predetermined movement patterns 30 printed thereon.

Figure 2:
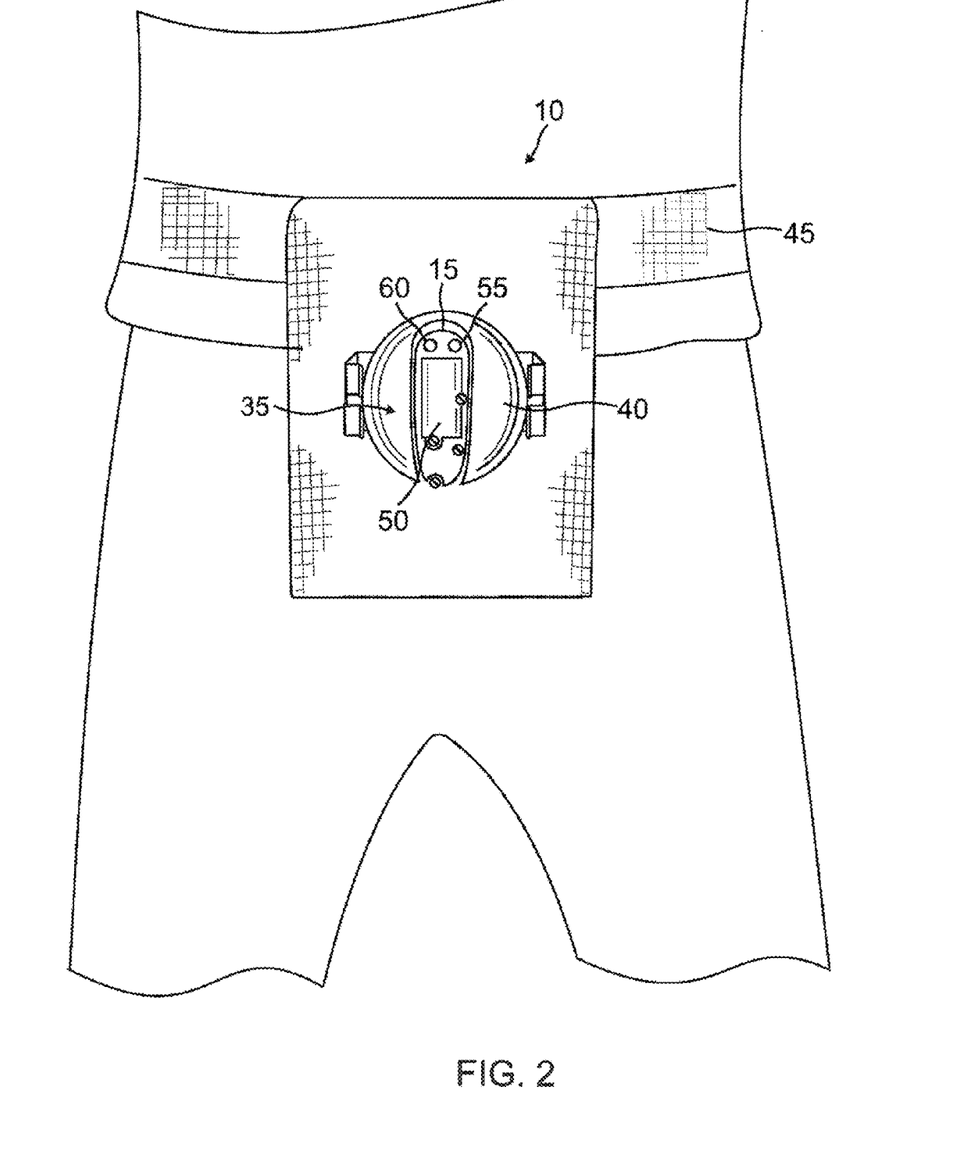
FIG. 2 shows one embodiment of the illumination source of FIG. 1 including a molded housing configured to enclose a laser device, a mounting stage for mounting the molded housing, and a waist belt for securing the illumination source to the body of a user.

More specifically, as shown in FIG. 2, in one embodiment the illumination source 10 includes a molded housing 35 constructed of plastic such as polypropylene or similar durable impact resistant material and configured to enclose the laser device 15 along with associated circuitry and components for operation of the laser device 15, a mounting stage 40 for mounting the molded housing 35, and a waist belt 45 for securing the illumination source 10 to the body of a user.

The molded housing 35 further includes a battery compartment 50 for housing a power source such as a battery or batteries for powering the laser device 15. In one embodiment the laser device 15 may be lower power and may be powered by a CR2 type battery. Persons of skill in the art will understand that other battery types including a rechargeable battery may be utilized depending on the type of laser device 15 used and its associated power requirements and characteristics. A power on/off switch 55 may be provided on the molded housing 35 for activating or deactivating (turning "on" or "off") the laser device 15 as needed. An orifice or aperture 60 may be further provided on the molded housing 35 to permit projection of the laser beam 20 from the laser device 15 to the target 25.

In one embodiment the optional mounting stage 40 is provided. The mounting stage 40 may be constructed of plastic, Styrofoam, or other suitable material, and is configured to provide a stable platform for mounting the molded housing 35 to the waist belt 45. The waist belt 45 is generally configured to be adjustable for use with a variety of users and may be secured to the user by Velcro, a buckle system, or the like.

Although the conditioning apparatus is described herein as utilizing a waist belt and related to sports conditioning, the conditioning apparatus may be used as a therapeutic tool as it may be configured to be positioned on virtually any part of the user's body to increase blood flow, and improve flexibility, coordination, strength, and control to name a few benefits.

Figure 3:
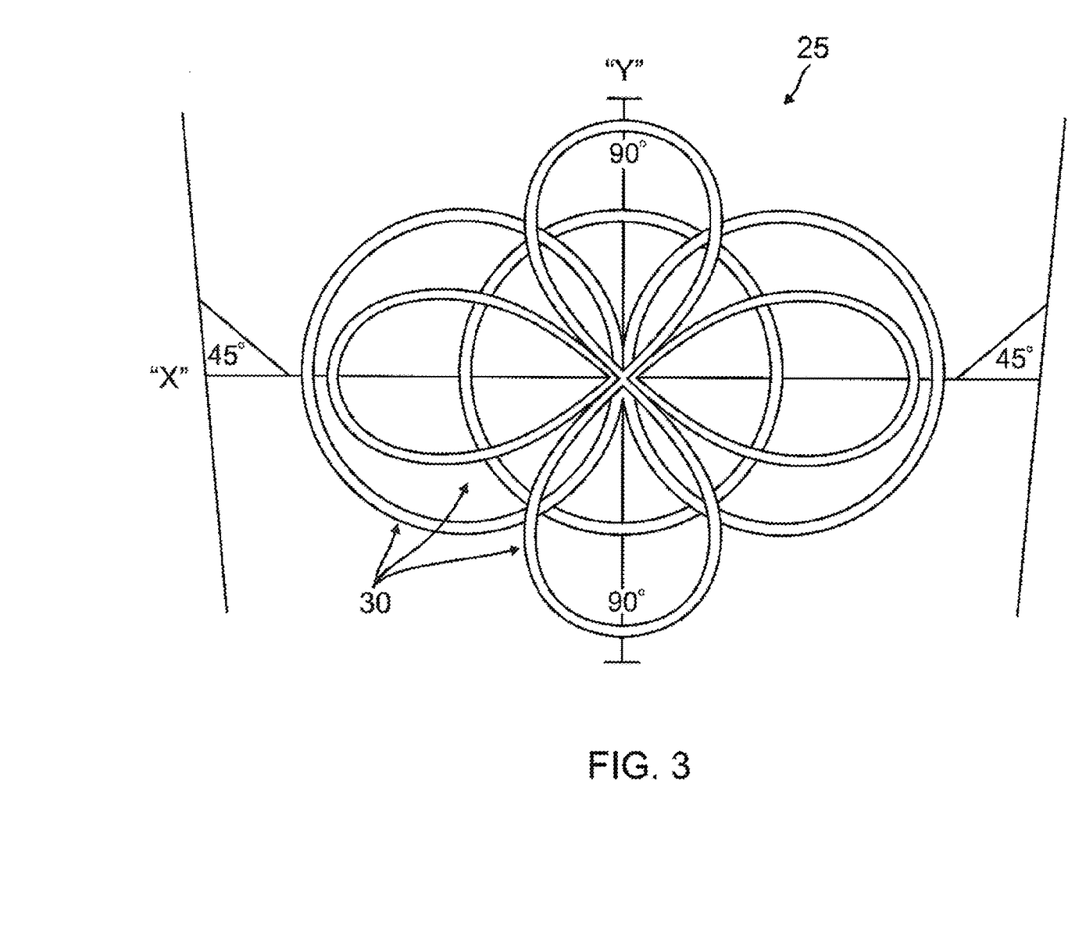
FIG. 3 shows one embodiment of a target for use with the illumination source of FIG. 1.

FIG. 3 shows one embodiment of a target 25 for use with the illumination source 10 of the conditioning apparatus 5. As indicated above, the target 25 includes one or more movement patterns 30 printed, placed, configured, or otherwise represented thereon. The movement patterns 30 may include circular, oval, elliptical, figure-eight, etc., movement patterns formed alone or in combination upon an X and Y Cartesian coordinate system that are designed to improve the flexibility, strength, and control, of among other things, the hips and core structure of a user, while ingraining and refining patterns of movement directly applicable to comparable movements used in a variety of sporting endeavors.

In one embodiment, a method of conditioning utilizing the conditioning apparatus 5 describe herein may include a preliminary warm-up including stretching of the user's limbs and torso, and generally increasing heart rate, and blood flow within the body. As indicated above and shown in FIG. 1, the sports conditioning apparatus 5 described herein includes an illumination source 10 having a laser device 15 for projecting a laser beam 20 as a point of reference so as to provide a user of the conditioning apparatus 5 with a precise and continuous real time visual representation of the user's body movement when following or tracing the one or more movement patterns 30. In this regard, following the warm-up, the conditioning apparatus 5 is positioned generally about the hip region of the user and secured such that the laser device 15 is place near the middle of the waist, perpendicular to the user, and approximately two feet from the target 25. The laser beam 20 is then projected onto the center of target where the X-axis and Y-axis cross.

The target 20 includes the movement patterns 30 printed thereon so that the user may attempt to follow or trace the movement patterns 30 with the user's own movement to thereby increase flexibility, strength, and control of the user's hips and core structure. In this regard, the hips of the user are used to move the laser beam 20 to trace the movement patterns 30 printed on the target 25 while following precise guidelines for postural alignment, appropriate use of force or muscle control, and number of repetitions or pattern tracing while progressing through various levels of pattern difficulty.

As described above, such visual representation of the user's body movement as indicted by the illumination source or visual cue provides an immediate feedback response to guide the user in proper biomechanics. In this regard, the "direct visual feedback" provided by the conditioning apparatus forms a unique "mind-body" connection to facilitate significant gains in body strength and flexibility in a relatively short period of time.

In one embodiment, a straight object of an appropriately length such as a golf club, baseball bat, or stick, may be held by the user directly over the user's head with the hands spaced apart from each other about shoulder width. This may be done to better isolate the hips or pelvis of the user and to encourage movement of the hips independent of the shoulders.

Conditioning movements are those movements made by the user wearing the illumination source that attempt to trace one or more of the movement patterns of the target. One such conditioning movement of the conditioning apparatus 5 may include a vertical pelvis movement in which the user may be made to stand up straight with feet parallel to the target 25 and knees slightly bent. The lower abdominals are contracted to perform a posterior pelvic tilt that results in the laser beam 20 being projected upward in a vertical direction along the Y-axis of the target 25 as shown by laser line "A". The user may be encouraged to move the laser beam 20 upward as high as possible using only the posterior pelvic tilt. In this regard, it is important not to lean back or otherwise move the upper body. The head, shoulders, and ribcage should remain stationary.

The vertical pelvis movement is now reversed in that the pelvis is brought back by contracting the lower back so that the laser beam moves downward in a vertical direction through the center of the target along the Y-axis as shown by laser line "B". As before, it is important not to lean forward or otherwise move the upper body.

Conditioning movements of the conditioning apparatus 5 may include a horizontal pelvis movement in which the user may be made to stand up straight with feet parallel to the target 25 and knees slightly bent. The hips are twisted or rotated to the left so the laser beam 20 is projected in a horizontal direction along the X-axis as shown by laser line "C". The user may be encouraged to move the laser beam 20 to the left as far as possible. In this regard, it is important to keep upper body including the head completely still, and the knees forward and feet flat on the floor. The head, shoulders, and ribcage should remain stationary. The hips are then rotated horizontally in the opposite direction along the X-axis as indicated by laser line "D".

Conditioning movements of the conditioning apparatus 5 may further include a circular pelvic movement in which the user may be made to stand up straight with feet parallel to the target 25 and knees slightly bent. The hips are moved into an anterior pelvic tilt by contracting the lower back resulting in the laser beam 20 being projected at a downward angle near the middle portion of the circular movement pattern. Keeping the head, shoulders, and ribcage still, the abdominals and pelvis are used to cause a posterior pelvic tilt resulting in the laser beam 20 moving to the left of center on the target 25 from 6 o'clock to 12 o'clock in a half circle shape. The laser beam 20 is moved continually clockwise on the right of center on the target 25 from 12 o'clock and returning to 6 o'clock to form a circle. The user should strive for a smooth trace of the circle movement pattern. The circular pelvic conditioning movement may be repeated by moving the laser beam 20 in the opposite direction to form a circle.

Conditioning movements of the conditioning apparatus 5 may further include a vertical figure eight pelvic movement in which the user may be made to stand up straight with feet parallel to the target 25 and knees slightly bent. In this conditioning movement, with the laser beam 20 placed in the center of the target the pelvis is moved upward and to the left to trace the laser beam 20 around the top portion of the ellipsis shown in FIG. 1. The laser beam 20 is then moved back to the center of the target, around the bottom portion of the ellipse until tracing of the figure eight movement pattern is completed. The vertical figure eight pelvic movement may be repeated in the opposite direction. The user should strive for a smooth trace of the vertical figure eight movement pattern in order to develop fluid rhythm that is crucial in the conductivity and transfer of power.

Conditioning movements of the conditioning apparatus 5 may further include a horizontal figure eight pelvic movement in which the user may be made to stand up straight with feet parallel to the target 25 and knees slightly bent. In this conditioning movement, with the laser beam 20 placed in the center of the target the pelvis is used to move the laser beam 20 along the right portion of the ellipsis, back to center, along the left portion of the ellipsis, and back to center to complete the tracing of the horizontal figure eight movement pattern. As with other conditioning movements, the horizontal figure eight pelvic movement may be repeated in the opposite direction. The user should strive for a smooth trace of the horizontal figure eight movement pattern, and to keep the head, shoulders, and legs as stationary as possible.

As indicated above, the conditioning apparatus 5 is configured and designed to improve the flexibility, strength, and control, of among other things, the hips and core structure of a user, while ingraining and refining patterns of movement directly applicable to comparable movements used in a variety of sporting endeavors. In this regard, the conditioning apparatus 5 generally increases the ability to generate force from the largest muscles of the body, improves stability, control of balance, and posture, as well as develops the ability to coordinate the upper and lower body, and the ability to create and deliver increased rotational acceleration and power.

As indicated above, the laser beam used to track the user's body movement may be projected onto a light sensitive target configured to convert the light received from the laser device into electronic or digital data capable of being stored on a computer readable medium or similar storage device for later viewing and analysis by the user.

In this regard, the conditioning apparatus may further include a processing element having a processing program and access to the storage device, and a processing-readable medium having executable instructions thereon to direct the processing system when used by the processing element to display the electronic data as a visual representation of the movement of the light upon the traceable pattern.

Such data storage of tracing information may be coupled with video-taping of the user performing the conditioning movements. In this regard, the user may display and review the combination of movement tracing and video taping preformed by the user to better isolate problem areas and to fine tune body movements to achieve superior conditioning of the hips and core structure.

Similar to the conditioning apparatus described above, as shown in FIGS. 4-5, the conditioning apparatus 5 may be further configured to include an illumination source 10, a molded housing 35 configured to enclose a laser device 15, and a retaining structure 65 configured to position the conditioning apparatus 5 about the head a user. As shown specifically, in FIG. 5, the retaining structure 65 is configured to fit around the head of a user and is secured in place by the use of a retaining wheel 70 that gradually reduces the circumference of the retaining structure 65.

Figure 4:
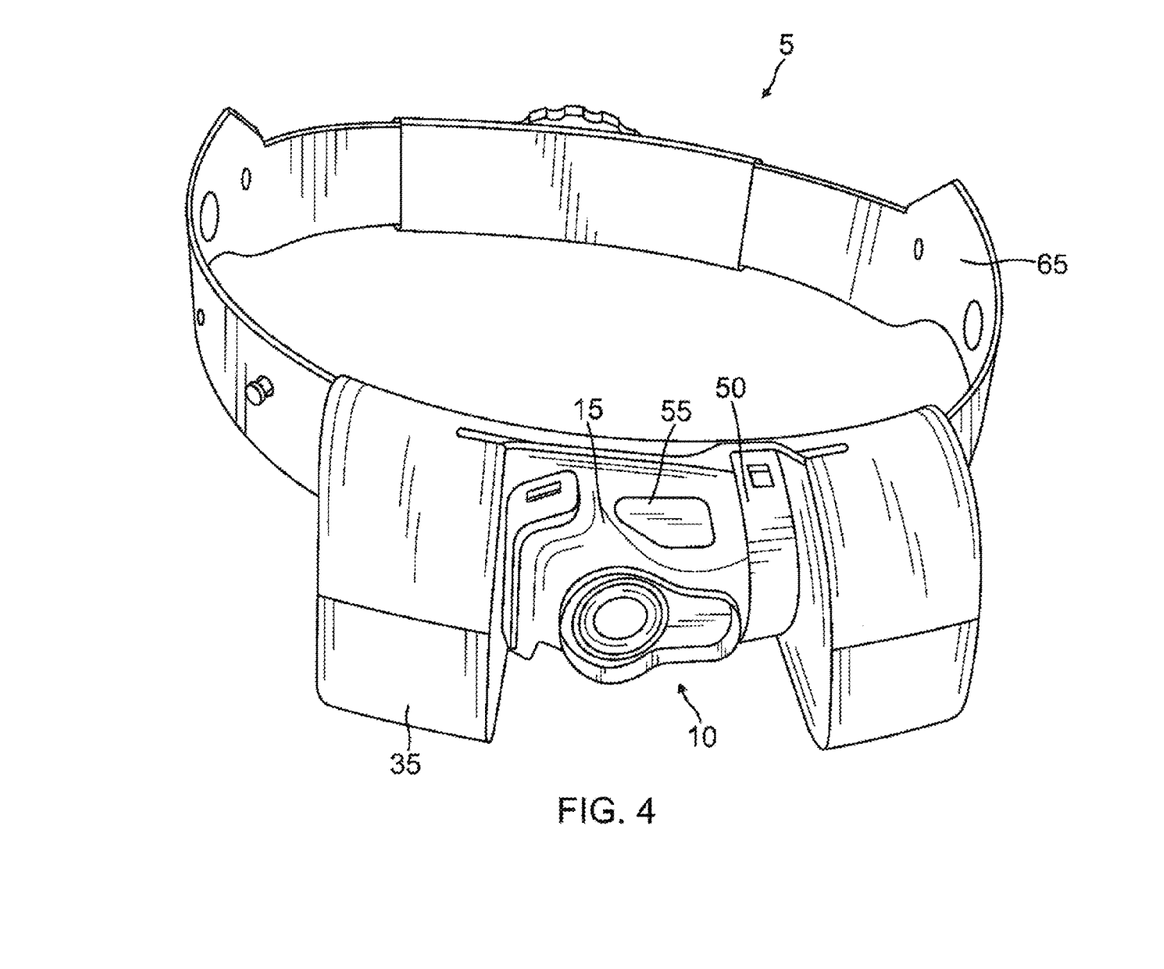
FIG. 4 is a front view showing a conditioning apparatus including an illumination source, a molded housing configured to enclose a laser device, and a retaining structure configured to position the illumination source about the head a user.
Figure 5:
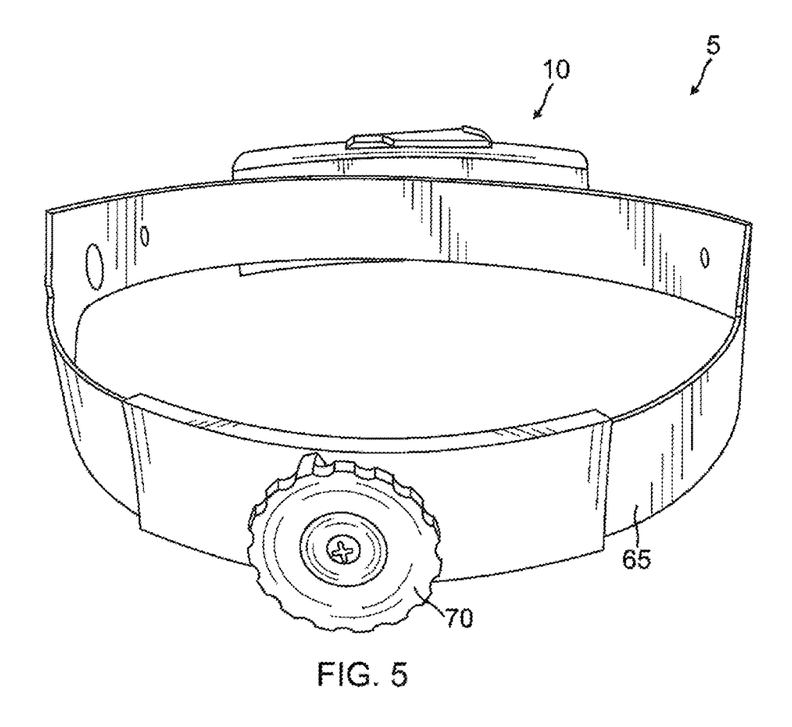
FIG. 5 is a back view of the conditioning apparatus of FIG. 4 including the molding housing configured to enclose the laser device, and the retaining structure configured to position the illumination source about the head a user.

When the conditioning apparatus 5 is positioned about the head of a user and utilized as described herein, that is, the user traces movement patterns 30 with the laser device 15 utilizing prescribed muscle groups, the conditioning device 5 shown in FIGS. 4-5 may be considered a therapeutic conditioning apparatus to improve various aspects of the mind (mental), body, and/or spirit. In this regard, the conditioning apparatus 5 may be configured and designed to increase mental focus, improve brain and visual coordination, increase reading and comprehension, improve balance as well as posture and general body alignment, relieve stress, and open energy channels or meridians throughout the body.

Persons of ordinary skill in the art will understand that such movement patterns 30 may be modified from those described relative to the conditioning apparatus 5 shown in FIGS. 1-3 to best accomplish the intended therapeutic results.

Similar to the conditioning apparatus described above, as shown in FIG. 6, the conditioning apparatus 5 may be further configured to include an illumination source 10, a molded housing 35 configured to enclose a laser device 15, and a retaining structure 75 configured to position the conditioning apparatus 5 on the body of the user (see FIG. 1), and more particularly, on one or more fingers or finger tips 80 of the user. As shown specifically in FIG. 6, the retaining structure 75 may be configured to fit around the finger tip of a user and is secured in place by the use of various methods including Velcro, friction, elastic, etc.

In this regard, as an example, due to an accident, genetic defect, illness, disease, or similar circumstance, an individual may be generally immobile and incapable of speech. Such individuals currently communicate nonverbally through the use of a computer mouse or similar device that is manipulated with the hand of the user and clicked with the finger to select a letter or word on a computer screen to facilitate nonverbal communication.

Figure 6:
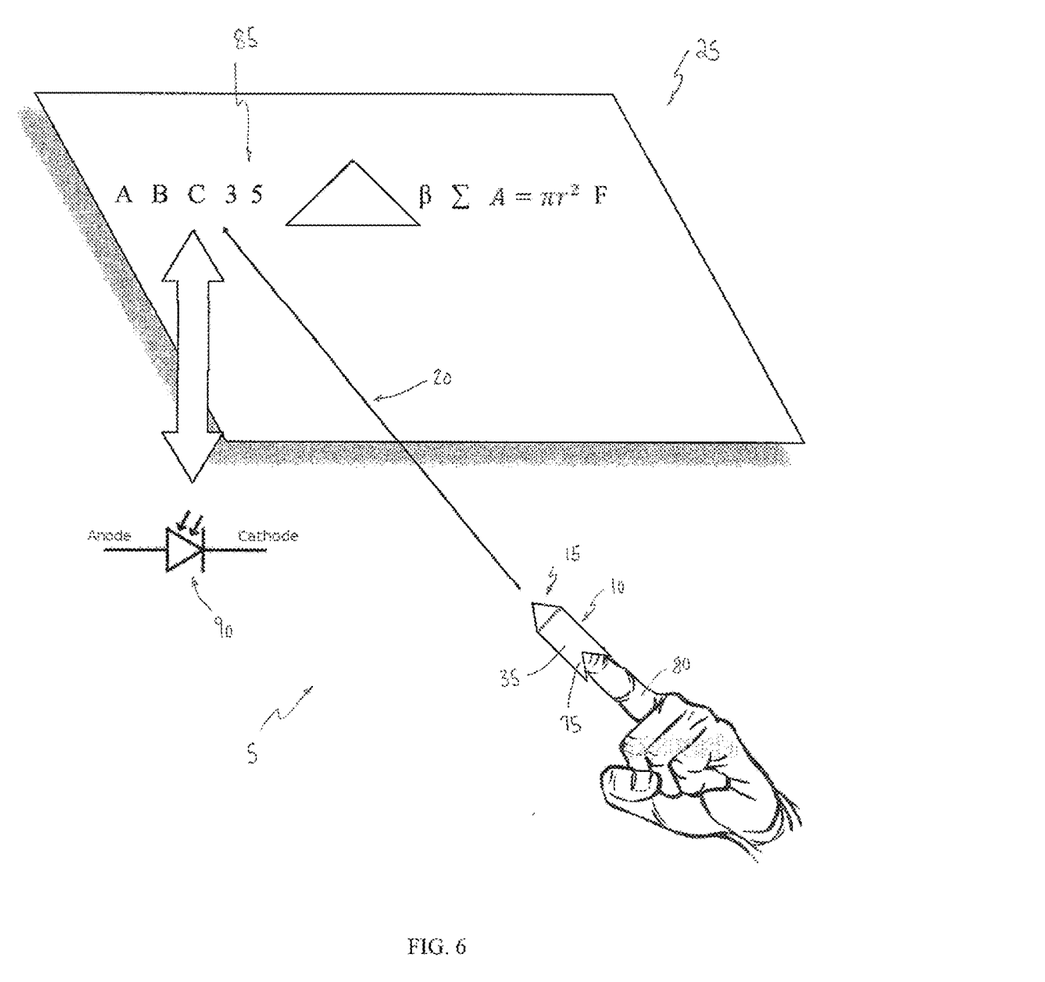
FIG. 6 shows a conditioning apparatus including an illumination source, a molded housing configured to enclose one or more laser devices, and a retaining structure configured to position the illumination source about the finger or finger tip of a user.

When the conditioning apparatus 5 is positioned on the finger or finger tip 80 of a user the user is able to position the laser beam 20 of the illumination source 10 on one or more letters, numbers, symbols, figures, pictures, patterns, or other indicia 85 formed, placed, or otherwise represented on the target 25 to activate the illuminated indicia. The indicia 85 are representative of a corresponding nonverbal communication such as a single idea, word(s), text, phrase, sentence, etc. In this regard, the represented nonverbal communication may be the same and the activated indicia 85, or as indicated above may represent a relative more detailed communication such as the phrase, sentence, general idea, etc.

In one embodiment, positioning of the illumination source 10 on a particular indicia 85 activates a light sensitive switch 90 (photodiode or other well known light sensitive device) disposed within the target 25 to complete a circuit connection with a computer, mobile (smart) phone, PDA, or other data device having an accessible processor, application, and memory (hardware and/or software) for performing data manipulation to enable the represented communication, i.e., idea, word(s), text, phrase, sentence, etc., to be retrieve from memory and transmitted or otherwise made available or accessible for viewing, audible transmission, or the like.

In this regard, the illumination source 10 may include one or more a laser devices such as laser device 15 for projecting two or more laser beams such as laser beam 20, each laser beam having a different intensity of light. In this regard, the illumination source 10 may be configured to permit the user to switch back-and-forth between the two laser beam intensities. In this manner, a first or lower intensity laser beam may be used as a visual cue to position the illumination source 10 on a specific indicia disposed on the target 25 without activating any of the light sensitive switches 90 of the light sensitive indicia 85. After locating the desired indicia with the first laser beam, a second or higher intensity laser beam may then be used to activate the indicia. Such switching between laser beams may be accomplished with a push-button switch, pressure sensitive switch, or similar type switching mechanism well known in the art and disposed directly on the illumination source 10 or disposed on a separate finger or finger tip of the user.

As such, the conditioning apparatus described herein may be configured and designed to increase the ability for nonverbal communication, as well as improve manual dexterity, hand-eye coordination and nerve regeneration.

When compared to current finger controlled devices for nonverbal communication, the conditioning apparatus 5 described herein and attached to the finger tip of the user increases the speed of nonverbal communication by simplifying the process. In this regard, the illumination source 10 positioned on the finger tip permits a relatively greater range of motion, and therefore potentially a greater range for the selection indicia, as the finger is able to move not only up, down, right, left, and diagonal, but is also able to rotate 360 degrees. Furthermore, in contrast manipulating a mouse and clicking on an object, a single act or step is all that is needed with the conditioning apparatus 5 described herein to select indicia with the illumination source 10 (placing illumination source 10 on the indicia) to enable or make accessible the corresponding representative idea, word(s), text, phrase, sentence, etc., for viewing, audible transmission, or the like. Accordingly, the finger tip illumination source 10 enables a greater selection of indicia, as well as a faster process of nonverbal communication.

The apparatus and methods of the claimed subject matter have been described with some particularity, but the specific designs, constructions and steps disclosed are not to be taken as delimiting of the subject matter. Obvious modifications will make themselves apparent to those of ordinary skill in the art, all of which will not depart from the essence of the claimed subject matter and all such changes and modifications are intended to be encompassed within the appended claims.

What is claimed is:

1. A conditioning apparatus comprising:
   a target having one or more light sensitive indicia disposed thereon; and
   an illumination source spaced apart from the target, the illumination source configured to be disposed on a user and project two lights each having a different intensity of light upon the target,
   wherein one of the lights is a visual cue to locate the one or more light sensitive indicia without activating the one or more light sensitive indicia, and the other light activates the one or more light sensitive indicia in response to movement of the user,
   wherein activation of the one or more light sensitive indicia enables a corresponding nonverbal communication to be made available.

2. The conditioning apparatus of claim 1, wherein the illumination source is configured to be disposed on the finger of the user.

* * * * *